(12) United States Patent
Sun et al.

(10) Patent No.: US 12,015,573 B2
(45) Date of Patent: Jun. 18, 2024

(54) DYNAMIC CONFIGURATION OF APERIODIC SOUNDING REFERENCE SIGNAL OFFSETS IN CELLULAR COMMUNICATIONS SYSTEMS

(71) Applicant: Apple Inc., Cupertino, CA (US)

(72) Inventors: Haitong Sun, Irvine, CA (US); Yushu Zhang, Beijing (CN); Huaning Niu, San Jose, CA (US); Hong He, Cupertino, CA (US); Wei Zeng, San Diego, CA (US); Chunxuan Ye, San Diego, CA (US); Oghenekome Oteri, San Diego, CA (US); Sigen Ye, Whitehouse Station, NJ (US); Dawei Zhang, Saratoga, CA (US); Jie Cui, San Jose, CA (US); Yang Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 138 days.

(21) Appl. No.: 17/439,059

(22) PCT Filed: Oct. 12, 2020

(86) PCT No.: PCT/CN2020/120264
§ 371 (c)(1),
(2) Date: Sep. 14, 2021

(87) PCT Pub. No.: WO2022/077138
PCT Pub. Date: Apr. 21, 2022

(65) Prior Publication Data
US 2022/0303088 A1 Sep. 22, 2022

(51) Int. Cl.
*H04L 5/00* (2006.01)
*H04L 41/0803* (2022.01)
*H04W 72/23* (2023.01)

(52) U.S. Cl.
CPC ........ *H04L 5/0048* (2013.01); *H04L 41/0803* (2013.01); *H04W 72/23* (2023.01)

(58) Field of Classification Search
CPC . H04L 5/0048; H04L 41/0803; H04L 5/0094; H04L 5/0051; H04W 72/23
See application file for complete search history.

(56) References Cited

U.S. PATENT DOCUMENTS

2019/0254061 A1   8/2019  Manolakos et al.
2020/0374918 A1*  11/2020  Ang .................. H04W 52/0229
(Continued)

FOREIGN PATENT DOCUMENTS

CN          110324124 A    10/2019

OTHER PUBLICATIONS

International Search Report for PCT Patent Application No. PCT/CN2020/120264; dated Jul. 13, 2021.
(Continued)

*Primary Examiner* — Kibrom T Hailu
(74) *Attorney, Agent, or Firm* — Kowert, Hood, Munyon, Rankin & Goetzel, P.C.

(57) ABSTRACT

A cellular base station (BS) which determines an aperiodic sounding reference signal (SRS) triggering offset configuration specifying an offset between an aperiodic SRS trigger received by a user equipment (UE) and transmission of the SRS by the UE. The cellular base station may determine that the SRS triggering offset should be adjusted. In response, the cellular base station may transmit signaling to the UE specifying a new value for the aperiodic SRS triggering offset. The new SRS triggering offset value may be partly based on a minimum timing offset for the UE and may be contained in a medium access control (MAC) control element (CE) or in downlink control information (DCI). Additionally, the new triggering offset value may be applicable
(Continued)

for a plurality of component carriers or bandwidth parts. The cellular base station may also determine a new triggering offset value due to conflicts regarding the AP-SRS transmission.

20 Claims, 13 Drawing Sheets

(56) References Cited

U.S. PATENT DOCUMENTS

| | | | | |
|---|---|---|---|---|
| 2020/0412581 | A1* | 12/2020 | Zhang | H04W 72/23 |
| 2021/0409178 | A1* | 12/2021 | Faxér | H04L 5/0053 |
| 2023/0033910 | A1* | 2/2023 | Khoshnevisan | H04W 72/54 |
| 2023/0056145 | A1* | 2/2023 | Gao | H04W 72/0453 |

OTHER PUBLICATIONS

CATT "Discussion on enhancements on SRS flexibility, coverage and capacity" 3GPP TSG-RAN WG1 #102-e R1-2005688; Aug. 17-28, 2020.

Qualcomm Incorporated "Enhancements on SRS flexibility, switching, coverage and capacity" 3GPP TSG-RAN WG1 Meeting #102-e R1-2006795; Aug. 17-28, 2020.

Interdigital, Inc. "Discussion on SRS Enhancements"; 3GPP TSG RAN WG1 #102-e R1-2005487; Aug. 17-28, 2020.

Apple Inc. "Views on Rel-17 SRS enhancement"; 3GPP TSG RAN WG1 #102-e R1-2006504; Aug. 17-28, 2020.

Extended European Search Report for EP 20956920.1; Apr. 23, 2024.

Huawei et al. "Summary of remaining details of SRS design"; 3GPP TSG RAN WG1 R1-1800090; Jan. 22, 2018.

Qualcomm Inc "Cross-slot scheduling power saving techniques"; 3GPP TSG RAN WG1 #96 R1-1905032; Apr. 8, 2019.

* cited by examiner

| R | BWP ID | Serving Cell ID | AP-SRS Trigger State | Slot Offset | SUL | ... | AP-SRS Trigger State | Slot Offset | SUL |

FIG. 8

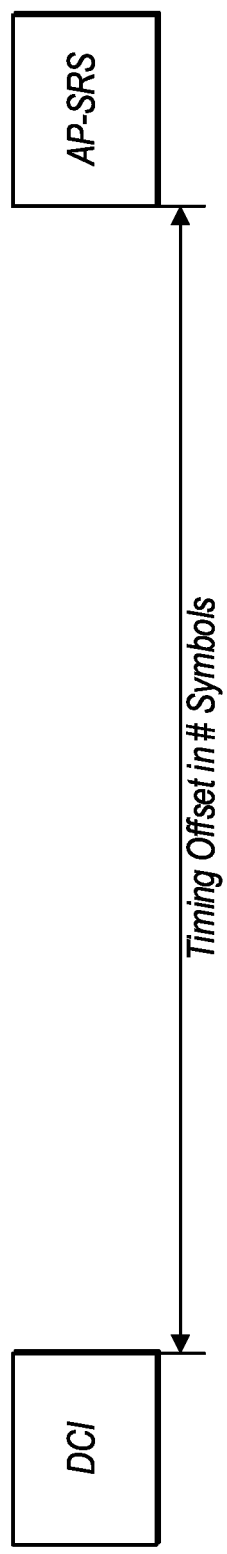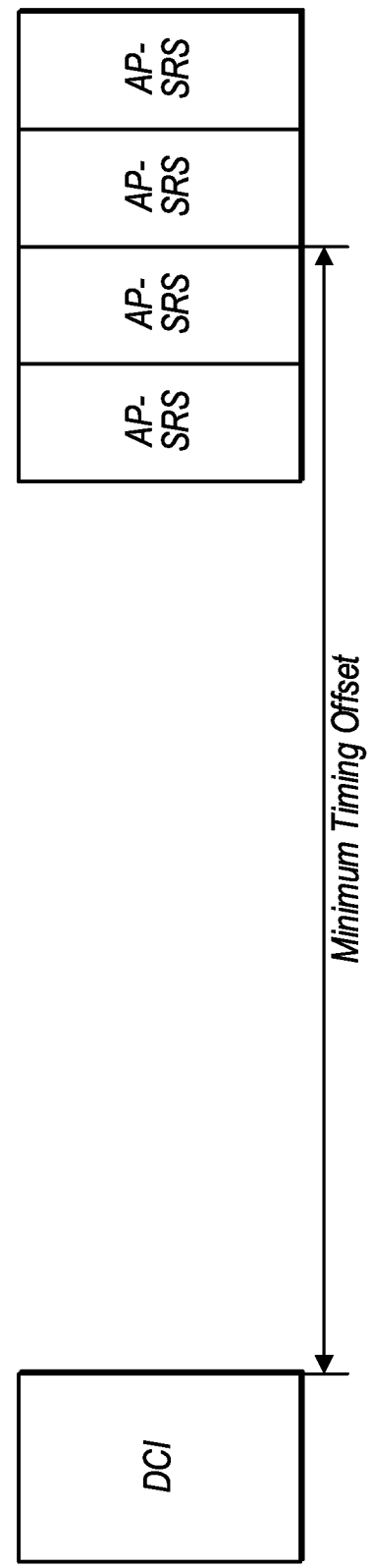

DYNAMIC CONFIGURATION OF APERIODIC SOUNDING REFERENCE SIGNAL OFFSETS IN CELLULAR COMMUNICATIONS SYSTEMS

PRIORITY CLAIM INFORMATION

This application is a national stage application of International Application No. PCT/CN2020/120264, filed on Oct. 12, 2020, titled "Dynamic Configuration of Aperiodic Sounding Reference Signal Offsets in Cellular Communications Systems", which is hereby incorporated by reference in its entirety. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The invention relates to wireless communications, and more particularly to apparatuses, systems, and methods for dynamically configuring aperiodic sounding reference signal (SRS) offsets for use by user equipment (UEs) in generating aperiodic SRS signals.

DESCRIPTION OF THE RELATED ART

"Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is currently the technology of choice for the majority of wireless network operators worldwide, providing mobile broadband data and high-speed Internet access to their subscriber base. LTE was first proposed in 2004 and was first standardized in 2008. Since then, as usage of wireless communication systems has expanded exponentially, demand has risen for wireless network operators to support a higher capacity for a higher density of mobile broadband users. Thus, in 2015 study of a new radio access technology began and, in 2017, a first release of Fifth Generation New Radio (5G NR) was standardized.

5G-NR, also simply referred to as NR, provides, as compared to LTE, a higher capacity for a higher density of mobile broadband users, while also supporting device-to-device, ultra-reliable, and massive machine type communications with lower latency and/or lower battery consumption. Further, NR may allow for more flexible UE scheduling as compared to current LTE. Consequently, efforts are being made in ongoing developments of 5G NR to take advantage of higher throughputs possible at higher frequencies."

One aspect of current cellular communication operation is provision by the UE of a Sounding Reference Signal (SRS) to the base station to enable the base station to assess the quality of the uplink channel. Improvements in the field are desired.

SUMMARY

Embodiments relate to wireless communications, and more particularly to apparatuses, systems, and methods for dynamically configuring aperiodic sounding reference signal (SRS) offsets for use by user equipment (UEs) in generating aperiodic SRS signals.

Some embodiments relate to a cellular base station (BS) comprising a plurality of antennas, a radio operably coupled to the plurality of antennas and a processor operably coupled to the radio. The cellular base station may be configured to determine an aperiodic sounding reference signal (SRS) triggering offset configuration for a user equipment (UE) during or after establishment of a radio resource connection (RRC) with the UE. The aperiodic SRS triggering offset configuration may specify an offset between an aperiodic SRS trigger received by the UE and transmission of the SRS by the UE in response to an aperiodic SRS trigger.

Moreover, after establishment of the RRC connection with the UE, the cellular base station may be further configured to determine that the SRS triggering offset should be adjusted. In response to this determination, the cellular base station may dynamically transmit signaling to the UE specifying a new value for the aperiodic SRS triggering offset. The new value for the aperiodic SRS triggering offset may be contained in a medium access control (MAC) control element (CE) or in downlink control information (DCI).

The new aperiodic sounding reference signal (SRS) triggering offset configuration value determined by the base station may be at least partly based on a minimum timing offset provided by the UE. Additionally, the new value for the aperiodic SRS triggering offset configuration may be applicable for a plurality of component carriers or bandwidth parts of the UE.

Embodiments described herein also relate to a memory medium that is capable of dynamically configuring aperiodic sounding reference signal (SRS) offsets for use by user equipment (UEs) in generating aperiodic SRS signals.

Embodiments described herein also relate to a user equipment (UE) that is capable of receiving and processing the dynamically configured aperiodic sounding reference signal (SRS) offsets as described above and then generating new aperiodic SRS signals in response thereto.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 8 illustrates an example of a media access center (MAC) control element (CE) sub-header, according to some embodiments.

FIG. 10 illustrates an example of a slot offset between downlink control information (DCI) and an aperiodic (AP) sounding reference signal (SRS), according to some embodiments.

FIG. 11 illustrates an example of when the UE is configured for SRS repetition or slot bundling, according to some embodiments.

Figure 1A:
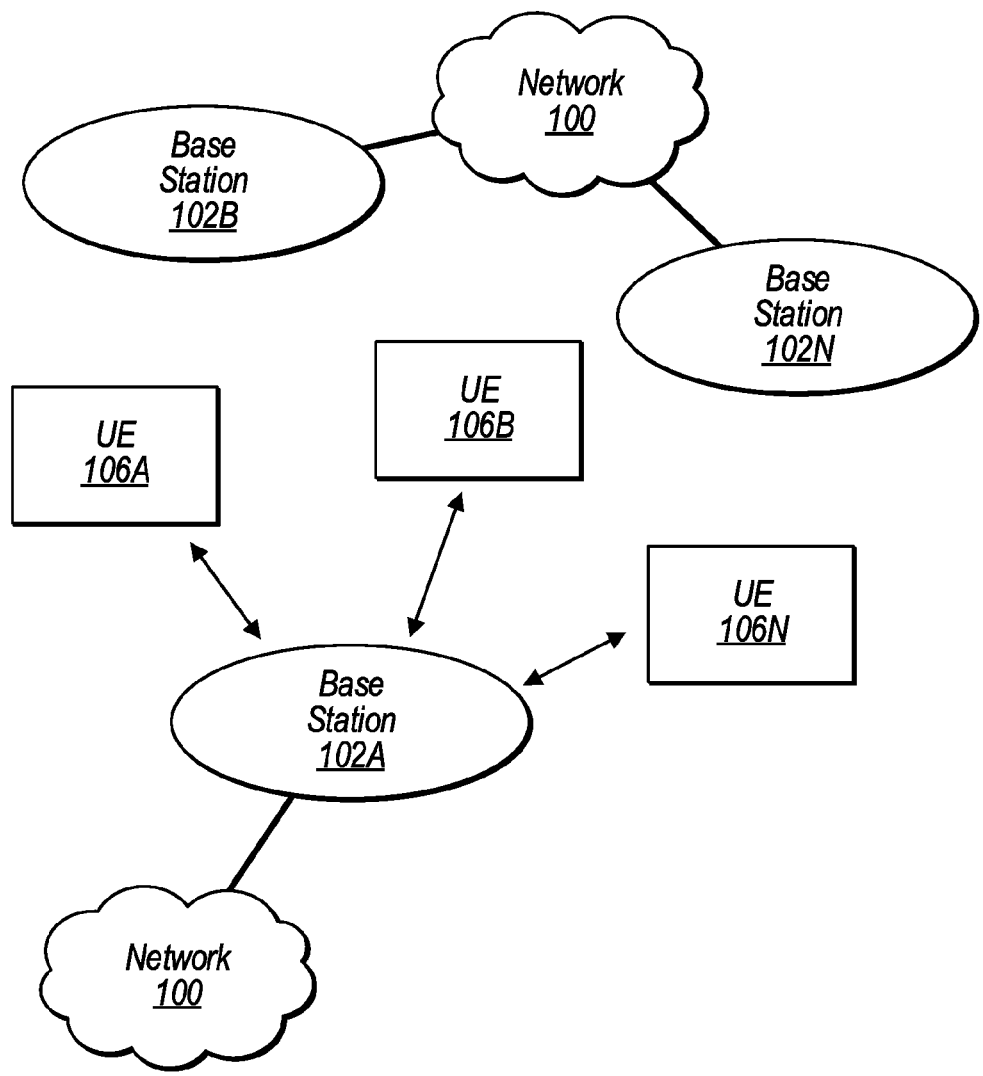
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
SRS: Sounding Reference Signal
AP-SRS: Aperiodic Sounding Reference Signal
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Information
AP: Aperiodic
SRS: Sounding Reference Signal
TRS: Tracking Reference Signal
NW: Network Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
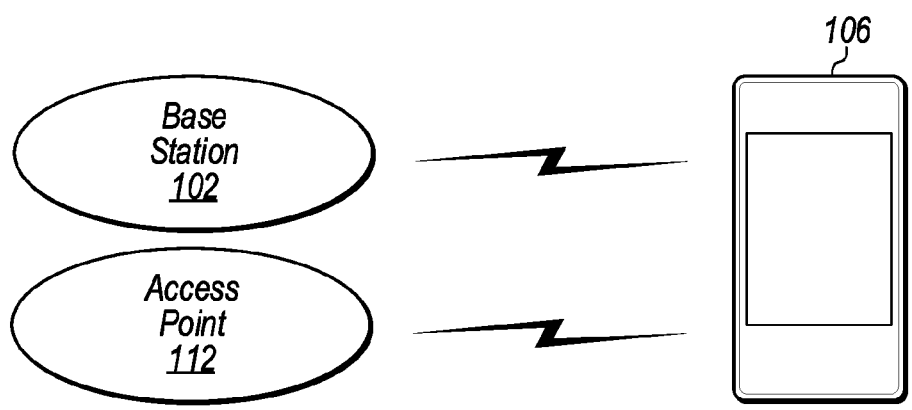
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
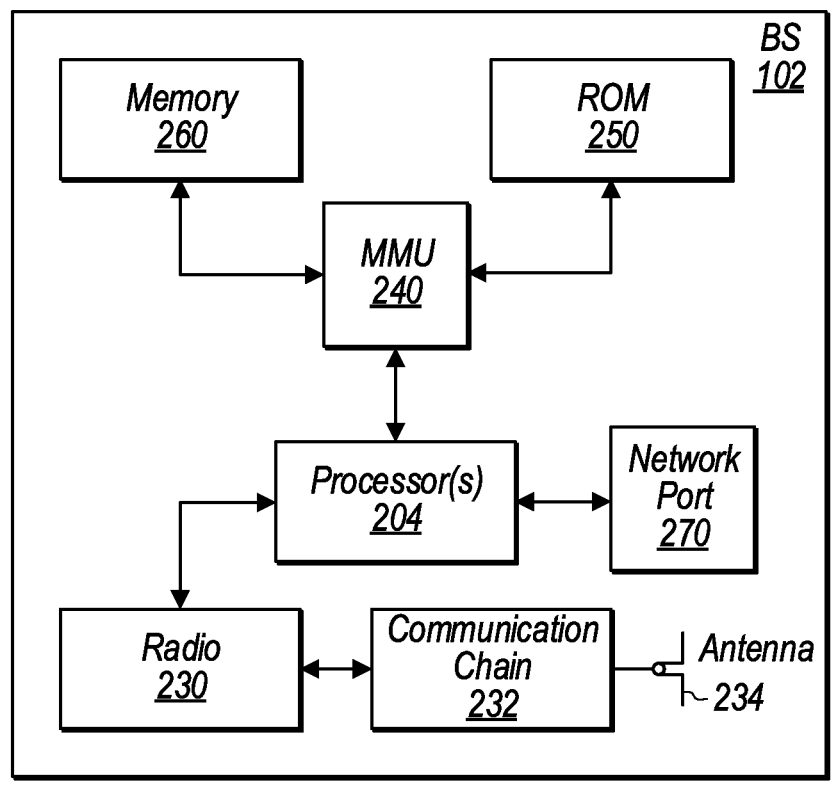
FIG. 2 illustrates an example block diagram of a BS according to some embodiments.

FIG. 2: Block Diagram of a Base Station

FIG. 2 illustrates an example block diagram of a base station 102, according to some embodiments. It is noted that the base station of FIG. 2 is merely one example of a possible base station. As shown, the base station 102 may include processor(s) 204 which may execute program instructions for the base station 102. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The base station 102 may include at least one network port 270. The network port 270 may be configured to couple to a telephone network and provide a plurality of devices, such as UE devices 106, access to the telephone network as described above in FIGS. 1 and 2.

The network port 270 (or an additional network port) may also or alternatively be configured to couple to a cellular network, e.g., a core network of a cellular service provider. The core network may provide mobility related services and/or other services to a plurality of devices, such as UE devices 106. In some cases, the network port 270 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 234, and possibly multiple antennas. The at least one antenna 234 may be configured to operate as a wireless transceiver and may be further configured to communicate with UE devices 106 via radio 230. The antenna 234 communicates with the radio 230 via communication chain 232. Communication chain 232 may be a receive chain, a transmit chain or both. The radio 230 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 204 of the base station 102 may be configured to implement or support implementation of part or all of the methods described herein, e.g., by executing program instructions stored on a memory medium (e.g., a non-transitory computer-readable memory medium). Alternatively, the processor 204 may be configured as a programmable hardware element, such as an FPGA (Field Programmable Gate Array), or as an ASIC (Application Specific Integrated Circuit), or a combination thereof. Alternatively (or in addition) the processor 204 of the BS 102, in conjunction with one or more of the other components 230, 232, 234, 240, 250, 260, 270 may be configured to implement or support implementation of part or all of the features described herein.

In addition, as described herein, processor(s) 204 may be comprised of one or more processing elements. In other words, one or more processing elements may be included in processor(s) 204. Thus, processor(s) 204 may include one or more integrated circuits (ICs) that are configured to perform the functions of processor(s) 204. In addition, each integrated circuit may include circuitry (e.g., first circuitry, second circuitry, etc.) configured to perform the functions of processor(s) 204.

Further, as described herein, radio 230 may be comprised of one or more processing elements. In other words, one or more processing elements may be included in radio 230. Thus, radio 230 may include one or more integrated circuits (ICs) that are configured to perform the functions of radio 230. In addition, each integrated circuit may include circuitry (e.g., first circuitry, second circuitry, etc.) configured to perform the functions of radio 230.

Figure 3:
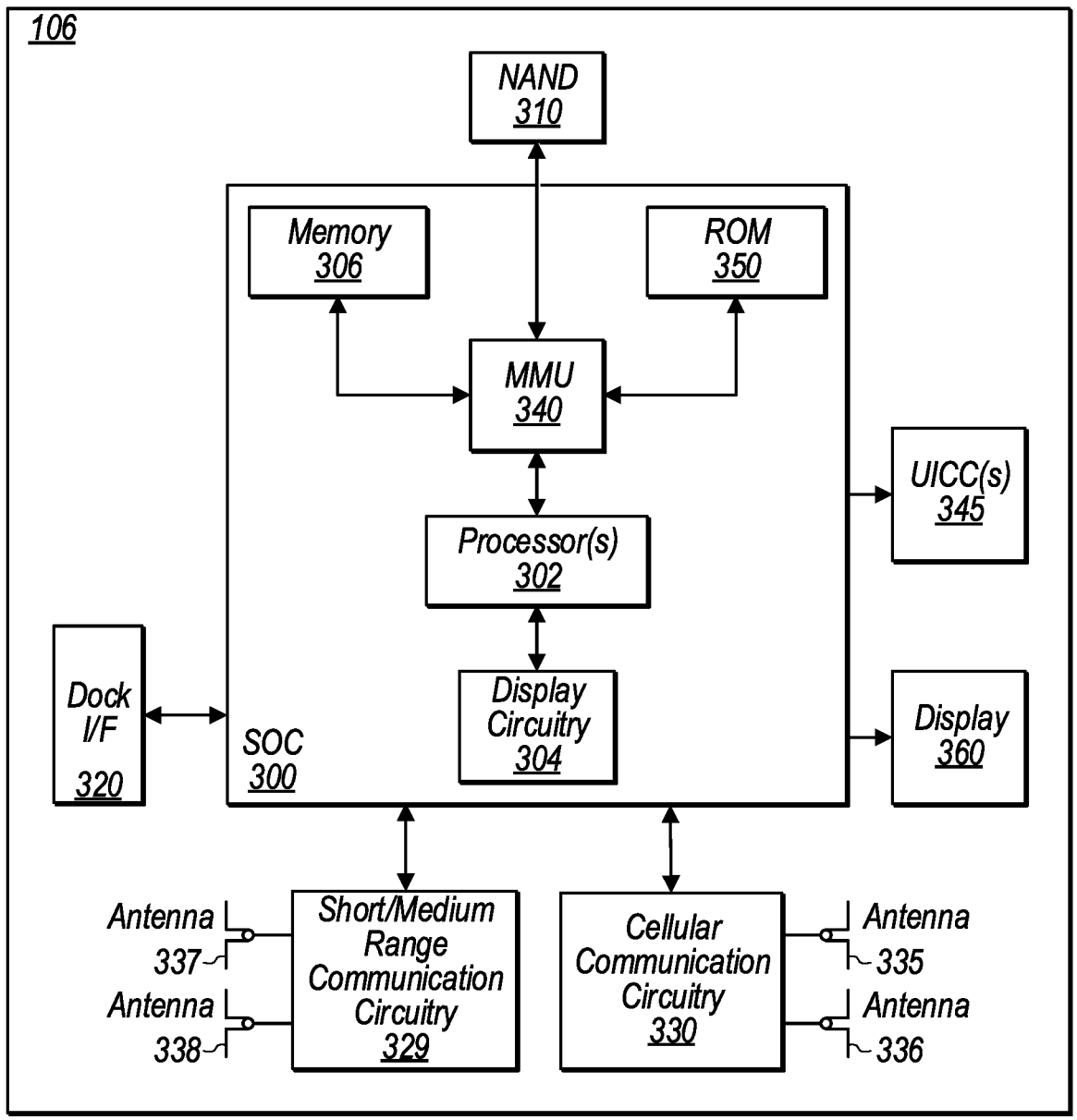
FIG. 3 illustrates an example block diagram of a UE according to some embodiments.

FIG. 3: Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 345 may be implemented as a removable smart card. Thus, the SIM(s) may be one or more removable smart cards (such as UICC cards, which are sometimes referred to as "SIM cards"), and/or the SIMs 345 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMs. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 345 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMs in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for dynamically configuring aperiodic sounding reference signal offsets such that a base station may receive correctly configured SRS signals from various UEs to allocate an appropriate frequency region to each of the UEs for the purpose of improving transmission and reception fidelity between the base station and UEs, as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
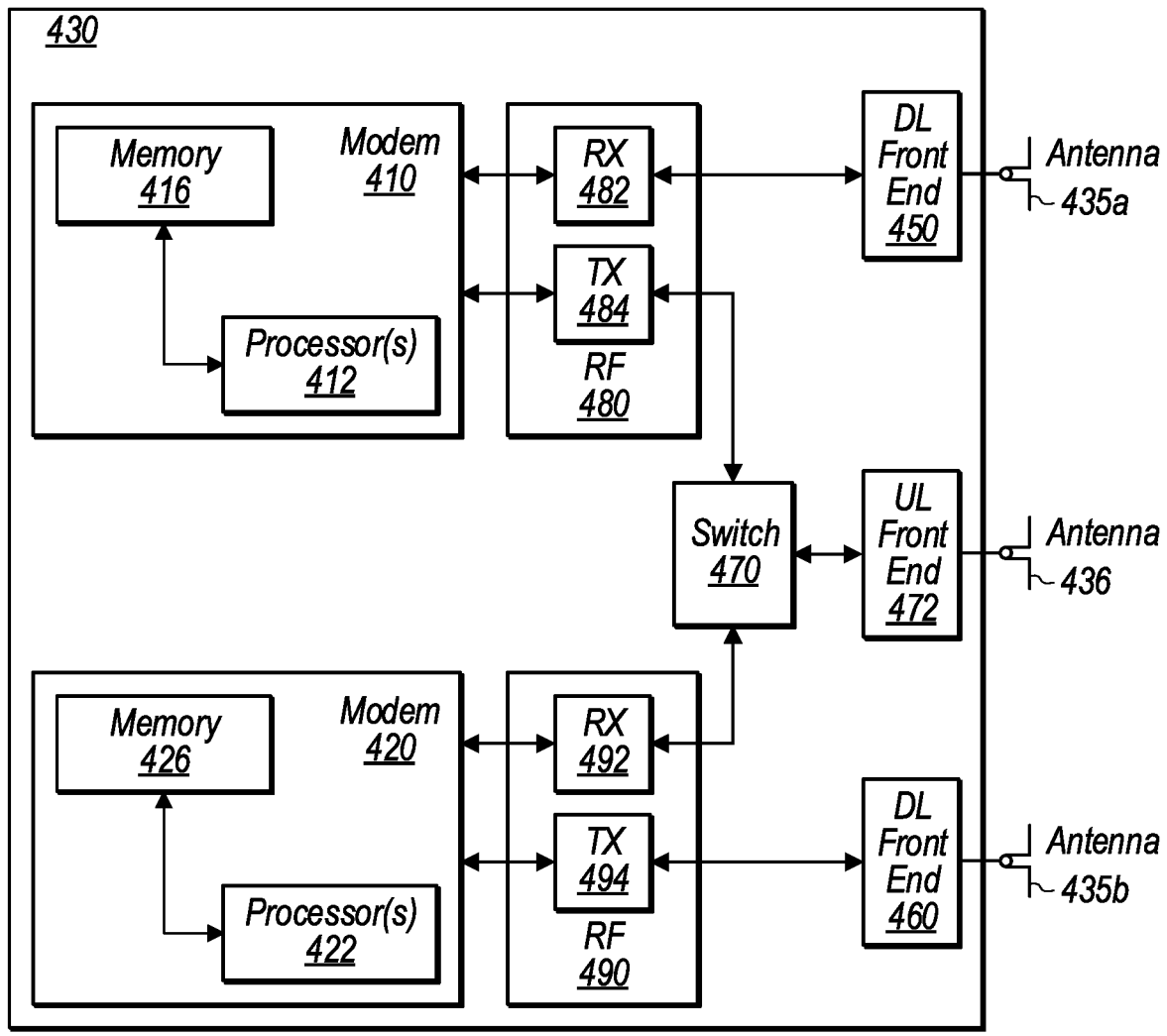
FIG. 4 illustrates an example block diagram of cellular communication circuitry, according to some embodiments.

FIG. 4: Block Diagram of Cellular Communication Circuitry

FIG. 4 illustrates an example simplified block diagram of cellular communication circuitry, according to some embodiments. It is noted that the block diagram of the cellular communication circuitry of FIG. 4 is only one example of a possible cellular communication circuit. According to embodiments, cellular communication circuitry 430 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 430 may couple (e.g., communicatively; directly or indirectly) to one or more antennas, such as antennas 435a-b and 436 as shown (in FIG. 4). In some embodiments, cellular communication circuitry 430 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 4, cellular communication circuitry 430 may include a modem 410 and a modem 420. Modem 410 may be configured for communications according to a first RAT, e.g., such as LTE or LTE-A, and modem 420 may be configured for communications according to a second RAT, e.g., such as 5G NR.

As shown, modem 410 may include one or more processors 412 and a memory 416 in communication with processors 412. Modem 410 may be in communication with a radio frequency (RF) front end 480. RF front end 480 may include circuitry for transmitting and receiving radio signals. For example, RF front end 480 may include receive circuitry (RX) 482 and transmit circuitry (TX) 484. In some embodiments, receive circuitry 482 may be in communication with downlink (DL) front end 450, which may include circuitry for receiving radio signals via antenna 435a.

Similarly, modem 420 may include one or more processors 422 and a memory 426 in communication with processors 422. Modem 420 may be in communication with an RF front end 490. RF front end 490 may include circuitry for transmitting and receiving radio signals. For example, RF front end 490 may include receive circuitry 492 and transmit circuitry 494. In some embodiments, receive circuitry 492 may be in communication with DL front end 460, which may include circuitry for receiving radio signals via antenna 435b.

In some embodiments, a switch 470 may couple transmit circuitry 494 to uplink (UL) front end 472. In addition, switch 470 may couple transmit circuitry 494 to UL front end 472. UL front end 472 may include circuitry for transmitting radio signals via antenna 436. Thus, when cellular communication circuitry 430 receives instructions to transmit according to the first RAT (e.g., as supported via modem 410), switch 470 may be switched to a first state that allows modem 410 to transmit signals according to the first RAT (e.g., via a transmit chain that includes transmit circuitry 484 and UL front end 472). Similarly, when cellular communication circuitry 430 receives instructions to transmit according to the second RAT (e.g., as supported via modem 420), switch 470 may be switched to a second state that allows modem 420 to transmit signals according to the second RAT (e.g., via a transmit chain that includes transmit circuitry 494 and UL front end 472).

In some embodiments, the cellular communication circuitry 430 may be configured to perform methods for dynamically configuring aperiodic sounding reference signal offsets such that a base station may receive correctly configured SRS signals from various UEs to allocate an appropriate frequency region to each of the UEs for the purpose of improving transmission and reception fidelity between the base station and UEs, as further described herein.

As described herein, the modem 410 may include hardware and software components for implementing the above features or for time division multiplexing UL data for NSA NR operations, as well as the various other techniques described herein. The processors 412 may be configured to implement part or all of the features described herein, e.g., by executing program instructions stored on a memory medium (e.g., a non-transitory computer-readable memory medium). Alternatively (or in addition), processor 412 may be configured as a programmable hardware element, such as an FPGA (Field Programmable Gate Array), or as an ASIC (Application Specific Integrated Circuit). Alternatively (or in addition) the processor 412, in conjunction with one or more of the other components 430, 432, 434, 450, 470, 472, 435 and 436 may be configured to implement part or all of the features described herein.

In addition, as described herein, processors 412 may include one or more processing elements. Thus, processors 412 may include one or more integrated circuits (ICs) that are configured to perform the functions of processors 412. In addition, each integrated circuit may include circuitry (e.g., first circuitry, second circuitry, etc.) configured to perform the functions of processors 412.

As described herein, the modem 420 may include hardware and software components for implementing the above features for communicating a scheduling profile for power savings to a network, as well as the various other techniques described herein. The processors 422 may be configured to implement part or all of the features described herein, e.g., by executing program instructions stored on a memory medium (e.g., a non-transitory computer-readable memory medium). Alternatively (or in addition), processor 422 may be configured as a programmable hardware element, such as an FPGA (Field Programmable Gate Array), or as an ASIC (Application Specific Integrated Circuit). Alternatively (or in addition) the processor 422, in conjunction with one or more of the other components 440, 442, 444, 450, 470, 472, 435 and 436 may be configured to implement part or all of the features described herein.

In addition, as described herein, processors 422 may include one or more processing elements. Thus, processors 422 may include one or more integrated circuits (ICs) that are configured to perform the functions of processors 422. In addition, each integrated circuit may include circuitry (e.g., first circuitry, second circuitry, etc.) configured to perform the functions of processors 422.

Figure 5:
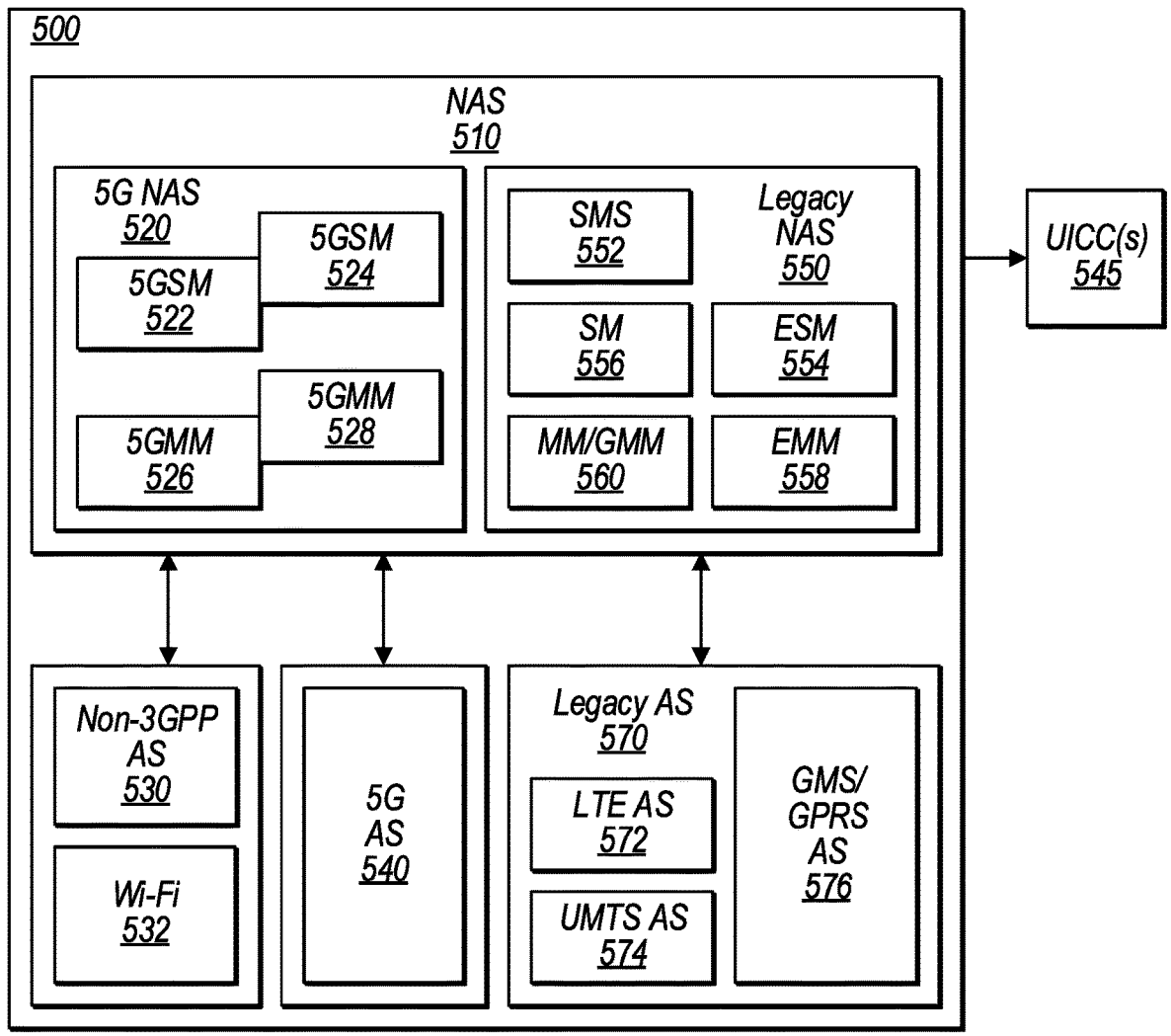
FIG. 5 illustrates an example of a baseband processor architecture for a UE, according to some embodiments.

FIG. 5 illustrates an example of a baseband processor architecture for a UE (e.g., such as UE 106), according to some embodiments. The baseband processor architecture 500 described in FIG. 5 may be implemented on one or more radios (e.g., radios 329 and/or 330 described above) or modems (e.g., modems 410 and/or 420) as described above. As shown, the non-access stratum (NAS) 510 may include a 5G NAS 520 and a legacy NAS 550. The legacy NAS 550 may include a communication connection with a legacy access stratum (AS) 570. The 5G NAS 520 may include communication connections with both a 5G AS 540 and a non-3GPP AS 530 and Wi-Fi AS 532. The 5G NAS 520 may include functional entities associated with both access stratums. Thus, the 5G NAS 520 may include multiple 5G MM entities 526 and 528 and 5G session management (SM) entities 522 and 524. The legacy NAS 550 may include functional entities such as short message service (SMS) entity 552, evolved packet system (EPS) session management (ESM) entity 554, session management (SM) entity 556, EPS mobility management (EMM) entity 558, and mobility management (MM)/GPRS mobility management (GMM) entity 560. In addition, the legacy AS 570 may include functional entities such as LTE AS 572, UMTS AS 574, and/or GSM/GPRS AS 576.

Thus, the baseband processor architecture 500 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods such as dynamically configuring aperiodic sounding reference signal offsets such that a base station may receive correctly configured SRS signals from various UEs to allocate an appropriate frequency region to each of the UEs for the purpose of improving transmission and reception fidelity between the base station and UEs, e.g., as further described herein.

Dynamic Aperiodic Sounding Reference Signal Triggering Offset

In current cellular communication systems, the UE can be configured to periodically, semi-persistently, or aperiodically transmits a Sounding Reference Signal (SRS) to the base station on an uplink channel. The SRS signal is used by the base station to assess the uplink channel quality between the UE and the base station. More particularly, in LTE systems the base station often allocates only a portion of the full system bandwidth to a specific UE at any given time. The base station may use the received SRS signal to determine which portion of the overall system bandwidth has the best relative uplink channel quality. In other words, the base station may use the received SRS signals from various UEs to allocate the "best" frequency region to each of the UEs, based on the uplink channel quality determined from the SRS signals.

The UE may transmit the SRS signal for various purposes or use cases, including antenna switching, beam management, codebook and non-codebook-based purposes, and for carrier switching. Antenna switching refers to a process whereby the UE may cycle through transmitting an SRS signal on each of its multiple antennas so that the base station can assess the downlink channel quality via an uplink channel quality estimate for each antenna. The UE may also transmit an SRS for the purpose of beam management, e.g., to allow the base station to assess the best beam orientation for improved uplink channel quality. The non-codebook-based use case refers to the base station using the received SRS to assess the downlink channel, assuming the uplink and downlink channels are similar (e.g., in the TDD case) and to aid in selecting a codebook for downlink communication. The term "carrier switching" refers to a situation where one or more UEs may be switching to use of a different component carrier, or different bandwidth part, in communicating with the base station.

As noted above, the UE may be configured to transmit an SRS signal at predefined intervals, i.e., according to a set period. However, the base station can also make a specific aperiodic request for the UE to transmit an SRS signal. The base station's request for an aperiodic SRS may take the form of an SRS trigger that is transmitted from the base station to the UE. The base station may decide to send an aperiodic SRS trigger to the UE due to detection of degradation in uplink channel quality, or other reasons.

The UE may receive the aperiodic SRS trigger and may then subsequently transmit the SRS signal to the base station. The UE may use a trigger offset to determine or calculate when to the transmit the SRS signal. The UE may apply the trigger offset, which is a time offset, to the time at which the aperiodic SRS trigger was received to determine the transmission time of the SRS signal.

In current implementations, the SRS trigger offset is statically determined by the base station and provided to the UE during RRC configuration. However, in some instances there may be conflict with downlink symbols and minimum timing offset requirements during SRS communications between the BS and the UE. These conflicts arising from invalid slot offsets can result in inefficiencies or failures related to invalid or incomplete transmissions between the base station and the UEs. Therefore, improvements in the field are desired.

Figure 6:
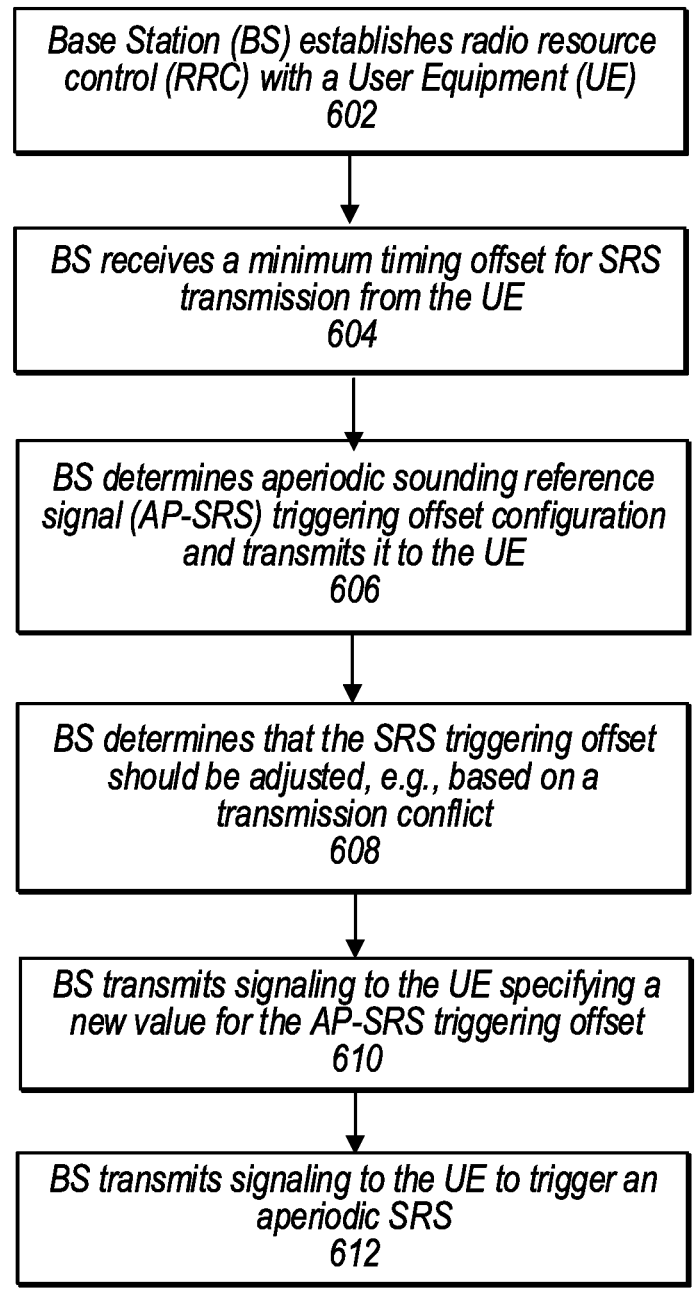
FIG. 6 illustrates an example flowchart for dynamically configuring the AP-SRS triggering offset from the perspective of a base station, according to some embodiments.

FIG. 6—Flowchart Diagram—Base Station Perspective of Configuring an AP-SRS Triggering Offset FIG. 6 illustrates an example flowchart of dynamically configuring an AP-SRS triggering offset from the perspective of a base station, according to some embodiments.

As shown in step 602, a base station (BS) establishes radio resource control (RRC) with a User Equipment (UE). The RRC protocol is capable of performing a number of different functions concerning the signaling between the BS and UE. For example, the RRC can facilitate broadcast of system information related to the characteristics of the radio interface. The RRC protocol is also capable of measurement reporting in which the BS entity can trigger measurements carried out by the UE either periodically or on demand (aperiodically, for instance). Additionally, the RRC protocol can facilitate the transport of NAS messages exchanged between the UE and the MME entity.

In step 604, as part of the RRC configuration or as a separate action, the base station may receive various capability information transmitted from the UE. This capability information may comprise a minimum timing offset for the SRS. As shown in FIG. 10, this minimum timing offset may correspond to the number of symbols between the last symbols of a triggering DCI and the first symbol of the corresponding triggered AP-SRS transmission. The UE's desire or need in transmitting this minimum timing offset arises due to the UE needing a certain amount of time to decode the DCI before sending the AP-SRS signal in response thereto. More specifically, because different UEs may have different processing capabilities, e.g., UEs from one manufacturer may have a faster processor than those of another, different UEs may have different minimum timing requirements in terms of processing an SRS trigger in received DCI and transmitting the requested SRS. Therefore, because of differing processing time requirements for receiving and implementing DCIs, different UEs may have varying minimum timing offsets.

Figure 9:
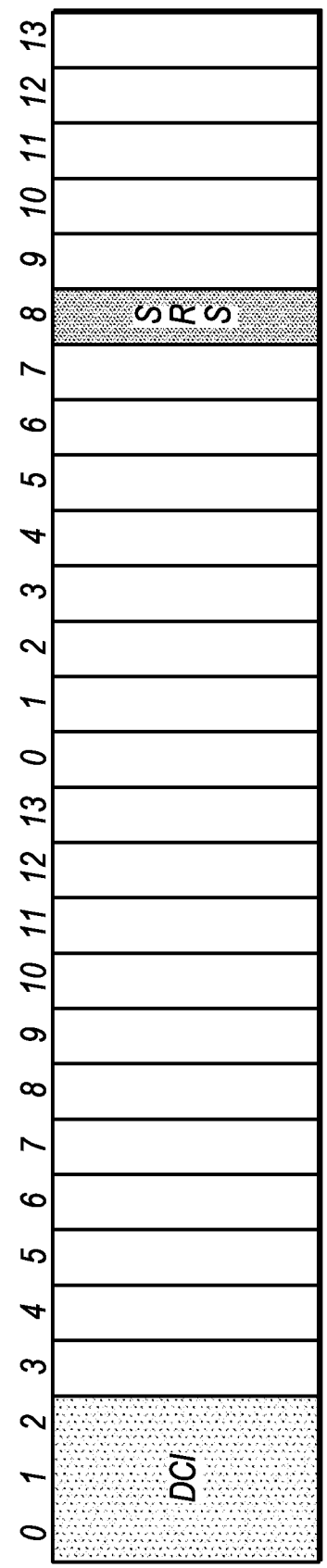
FIG. 9 illustrates an example of the timing offset for UE capability reporting for AP-SRS, according to some embodiments.

Furthermore and because of this minimum timing offset, in most cases the SRS is typically sent in the last six symbols of a slot as shown in FIG. 9. This being the case, with a DCI sent in the first three symbols of the first slot and an AP-SRS being sent in the first available symbol of the last six symbols of the second slot, this corresponds to a gap of approximately 19 symbols. This slot spacing or gap may allow for the UE to have the time required to decode the DCI.

In some embodiments, the UE may simply report whether or not the UE requires a minimum 19 symbol timing offset. In other embodiments, the UE may report a minimum timing offset from a list of pre-stored or preset values (7, 14, 19, etc.) corresponding to the number of symbols. In some embodiments, in a situation where the UE does not report a minimum timing offset, the BS assumes a minimum timing requirement as hardcoded in its specifications. In other embodiments, for frequency ranges between 60 and 120 kHz, the minimum timing offset reported by the UE may be based off of beam switch timing parameters. In other embodiments, the new minimum timing offset related capability can be reported by the UE for 15 kHz SCS and 30 kHz SCS. In other embodiments, the new minimum timing offset is reported per band to include licensed and unlicensed bands.

In some embodiments, PDCCH monitoring capabilities and PUSCH process capabilities may be replicated from a previous 3GPP release in order to address—backwards compatibility issues. More specifically, when the UE is configured to report the minimum timing offset for AP-SRS, the UE may also report a duplicate or replica of PUSCH-ProcessingType2 as PUSCH-ProcessingType2-r16. More specifically, the following excerpt from the Technical Specification 38.331 provides further insight with regard to how the UE may report separate PUSCH processing capability #2: one for Rel-15 NW and one for Rel-16 NW for backwards compatibility concerns.

Excerpt—Technical Specification 38.331—PUSCH-ProcessingType2:

```
<unchanged parts omitted>
FeatureSetUplink-v1540 ::= SEQUENCE {
zeroSlotOffsetAperiodicSRS ENUMERATED {supported} OPTIONAL,
pa-PhaseDiscontinuityImpacts ENUMERATED {supported} OPTIONAL,
pusch-SeparationWithGap ENUMERATED {supported} OPTIONAL,
pusch-ProcessingType2 SEQUENCE {
scs-15kHz    ProcessingParameters OPTIONAL,
scs-30kHz    ProcessingParameters OPTIONAL,
scs-60kHz    ProcessingParameters OPTIONAL
} OPTIONAL,
ul-MCS-TableAlt-DynamicIndication ENUMERATED {supported}
OPTIONAL
}
FeatureSetUplink-v1610 ::= SEQUENCE {
pusch-ProcessingType2-r16 SEQUENCE {
scs-15kHz-r16    ProcessingParameters OPTIONAL,
scs-30kHz-r16    ProcessingParameters OPTIONAL,
scs-60kHz-r16    ProcessingParameters OPTIONAL
} OPTIONAL,
}
<unchanged parts omitted>
```

Moreover, the PUSCH-ProcessingType2 detailed in the Technical Specification excerpt above indicates the UE support of PUSCH processing capability #2 for the Rel-15 NR network while the PUSCH-ProcessingType2-r16 indicates the UE support of PUSCH processing capability #2 for the Rel-16 NR network, which can be different from the Rel-15 NR network. In the current NR specification, the aperiodic tracking reference signal, (AP-TRS) minimum timing offset is defined based on the PUSCH processing capability. Furthermore, PUSCH processing capability #2 is a Rel-15 NR UE feature. The new capability introduced for the minimum timing offset decouples the AP-TRS processing from PUSCH processing timing. Therefore, in a Rel-16 network (NW) which can understand the new AP-TRS minimum timing offset related capability, the UE can support PUSCH processing capability #2 but may not support shorter AP-TRS processing times, e.g. <19 symbols. However, the new AP-TRS minimum timing offset related capability is not understandable by Rel-15 NW and the NW will not provide the release of the minimum timing offset in a NR network. Thus, in a Rel-15 NW, the UE cannot support PUSCH processing capability #2 in the above example. As a result, the UE may report separate PUSCH processing capability #2: one for Rel-15 NW and one for Rel-16 NW for backwards compatibility concerns. In other embodiments, for AP-SRS the slot offset is preferably configured and if the AP-SRS slot offset is not configured, it is assumed to be one slot.

This capability information from the UE, such as the minimum timing offset information, is useable by the base station to determine and provide an appropriate triggering offset configuration (or offset value) to the UE in order for the UE to be able to send the AP-SRS at the correct time. In other words, the base station may receive the minimum timing offset provided by the UE and use this minimum timing offset in determining the appropriate SRS offset value (the SRS triggering offset configuration) to provide to the UE in 606.

As used herein, the term "triggering offset configuration" or "AP-SRS triggering offset configuration" may comprise an offset value and may possibly include other related trigger offset information, such as a lifetime or validity period for the offset, among other possible information.

In step 606 the BS determines the aperiodic sounding reference signal (AP-SRS) triggering offset configuration for the UE. As noted above, the BS uses the capability information provided by the UE in step 604, which may include minimum timing offset information corresponding to the UE, to determine the appropriate AP-SRS triggering offset configuration for the UE. If the UE's capability information does contain minimum timing offset information, the BS will accordingly provide the UE with a triggering offset configuration that meets or exceeds the minimum timing offset requirement. As discussed above, in some embodiments, if the UE does not report the minimum timing offset, the BS may assume and use a predetermined minimum timing offset value based on a hardcoded value according to its specifications. The base station then transmits the determined AP-SRS triggering offset to the UE and the UE receives the AP-SRS triggering offset configuration.

Next, in step 608, the BS may later determine that the SRS triggering offset should be adjusted based on a transmission conflict. Thus, during or after RRC configuration wherein the UE has received an initial triggering offset, later during ongoing communication with the UE the BS may decide that it should send a new or updated triggering offset value to the UE. Due to the base station's inherent knowledge of the timing of communications between itself and the UE, the BS is able to determine if any transmission or reception issues have occurred or will likely occur. In other words, because the BS is fully aware of the symbols, and their respective timings, being exchanged between the BS and the UE in UL and DL channels, the BS is able to determine any conflict that may arise due to overlapping or colliding symbols of the transmissions. For example, if the BS determines that a slot offset of the AP-SRS is invalid, e.g., that UE transmission of the SRS based on the current slot offset will result in a collision or conflict with DL symbols, the BS will determine that the SRS triggering offset needs to be adjusted in order to avoid this collision or overlap. Similarly, if the slot offset is invalid due to not meeting a minimum timing offset requirement for the UE, the BS will determine that the SRS triggering offset should be adjusted so as to meet the minimum timing requirement.

Accordingly, the BS proceeds with step 610 in which the BS determines a new SRS triggering offset value and transmits signaling to the UE specifying the new value for the AP-SRS triggering offset. For example, if the BS determines that the current or previous triggering offset value would result in a conflict, the BS in 610 determines or selects a new triggering offset value that does not result in a such a conflict. The UE will then process the signaling from the BS and make the necessary configuration changes to apply (e.g., store and later utilize) the new AP-SRS triggering offset value. When the UE next receives a trigger from the base station for an aperiodic SRS, it will utilize the new AP-SRS triggering offset that it was provided from the base station in calculating when to send the SRS. In some embodiments, the BS may transmit signaling that is designed to update the SRS triggering offset in each of a plurality of UE.

In some embodiments, the new or updated SRS value may have a preset lifetime, e.g., the updated SRS value may be designed to be used once or a preset number of times by the UE and then the UE may revert back to a previous offset value, such as the one provided during or after RRC configuration. Alternatively, in 610 the BS may also include time information specifying either an amount of time or a number of future SRS transmissions during which the new SRS offset value is valid, after which the UE reverts back to the previous or initial offset value.

Finally, in step 612, the BS transmits signaling to the UE to trigger an aperiodic SRS. For example, in order for the BS to confirm that it has provided the UE with an appropriate AP-SRS triggering offset value, the BS can trigger an AP-SRS event after transmitting said triggering offset value. In other embodiments, the BS could trigger an AP-SRS due to a degraded signal between itself and the UE.

The base station can then utilize the AP-SRS sent from the UE to determine or estimate the quality of the channel. Information provided by said estimates are then used to schedule uplink transmissions on resource blocks of good quality. Additionally, due to the UE's utilization of the newly provided and adjusted triggering offset value, the UE and BS are able to communicate more efficiently by avoiding unnecessary collisions with DL symbols and/or invalid slot offset values due to minimum timing offset requirements of the UE. In doing so, the UE and BS can avoid faulty and even repetitive transmissions which can directly improve efficiency by lowering latency and bandwidth usage.

Figure 7:
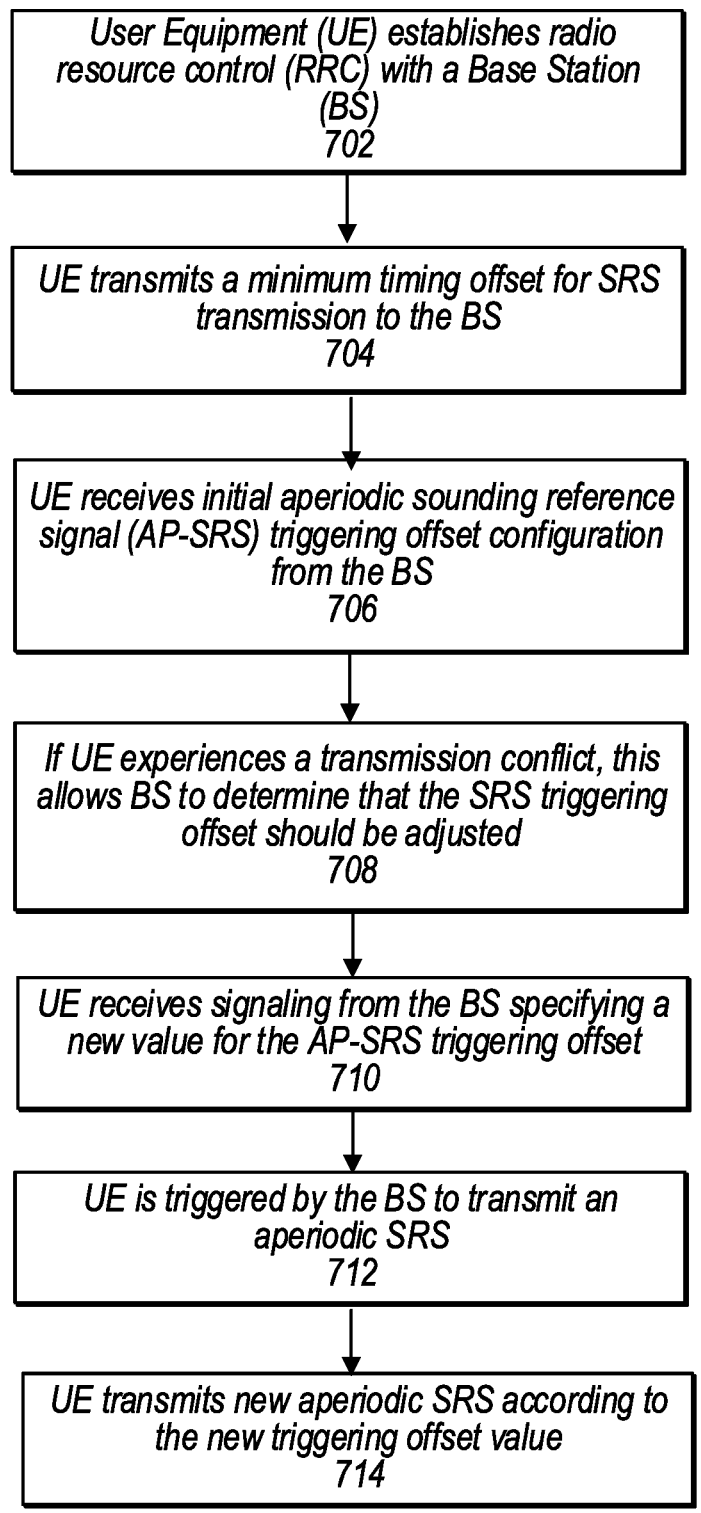
FIG. 7 illustrates an example flowchart for dynamically configuring the AP-SRS triggering offset from the perspective of a UE, according to some embodiments.

FIG. 7—Flowchart Diagram—User Equipment Perspective of Utilizing an AP-SRS Triggering Offset FIG. 7 illustrates an example flowchart of dynamically utilizing an AP-SRS triggering offset from the perspective of a user equipment, according to some embodiments.

As shown in step 702, a User Equipment (UE) establishes radio resource control (RRC) with a base station (BS). As discussed above in regard to FIG. 6, the RRC protocol is capable of performing a number of different functions concerning the signaling between the BS and UE.

In step 704, as part of the RRC configuration or as a separate action, the user equipment may transmit various capability information to the base station. This capability information may comprise a minimum timing offset for the SRS. As discussed above in regard to FIG. 6, this minimum timing offset may be reported in accordance with a number of different embodiments described previously. The base station may receive the minimum timing offset provided by the UE and use this minimum timing offset in determining the appropriate SRS offset value (the SRS triggering offset configuration) to provide to the UE in 706.

In step 706 the UE receives an initial aperiodic sounding reference signal (AP-SRS) triggering offset configuration from the BS. As noted above, the BS uses the capability information provided by the UE in step 704, which may include minimum timing offset information corresponding to the UE, to determine the appropriate AP-SRS triggering offset configuration for the UE.

Next, in step 708, the UE may experience a transmission conflict with allows the BS to determine that the SRS triggering offset should be adjusted. As discussed above with regard to FIG. 6, during or after RRC configuration wherein the UE has received an initial triggering offset, later during ongoing communication with the UE the BS may decide that it should send a new or updated triggering offset value to the UE. For example, if the BS determines that a slot offset of the AP-SRS is invalid, e.g., that UE transmission of the SRS based on the current slot offset will result in a collision or conflict with DL symbols, the BS will determine that the SRS triggering offset needs to be adjusted in order to avoid this collision or overlap. Similarly, if the slot offset is invalid due to not meeting a minimum timing offset requirement for the UE, the BS will determine that the SRS triggering offset should be adjusted so as to meet the minimum timing requirement.

Accordingly, the UE proceeds with step 710 in which the UE receives a new SRS triggering offset value from the BS. As discussed above in regard to FIG. 6, the UE will then process the signaling from the BS and make the necessary configuration changes to apply (e.g., store and later utilize) the new AP-SRS triggering offset value. When the UE next receives a trigger from the base station for an aperiodic SRS, it will utilize the new AP-SRS triggering offset that it was provided from the base station in calculating when to send the SRS.

Next, in step 712, the UE receives trigger signaling from the base station to transmit an aperiodic SRS.

Finally, in step 714, in response to the trigger received in 712, the UE transmits the new aperiodic SRS based on the new triggering offset value received by the UE in 710. In other words, in response to the trigger transmitted by the BS in 712, the UE uses the new triggering offset value in determining or calculating when to transmit the SRS that is responsive to the received trigger signal.

The base station can then utilize the AP-SRS sent from the UE to determine or estimate the quality of the channel. Information provided by said estimates are then used to schedule uplink transmissions on resource blocks of good quality. Additionally, due to the UE's utilization of the newly provided and adjusted triggering offset value, the UE and BS are able to communicate more efficiently by avoiding unnecessary collisions with DL symbols and/or invalid slot offset values due to minimum timing offset requirements of the UE. In doing so, the UE and BS can avoid faulty and even repetitive transmissions which can directly improve efficiency by lowering latency and bandwidth usage.

FIG. 8—MAC CE Containing a New Trigger Offset Value

FIG. 8 illustrates an example of a media access center (MAC) control element (CE) sub-header, which is used by the base station to transmit an updated triggering offset value to the UE, according to some embodiments. FIG. 8 further illustrates examples of corresponding fields of the MAC-CE labeled as R (reserved bit), BWP ID (bandwidth part ID), Serving Cell ID, SUL (Supplemental Uplink), Aperiodic (AP)-Sounding Reference Signal (SRS) trigger state, and Slot Offset. In some embodiments, the MAC-CE could be used to provide the triggering slot offset value to a UE. In particular, the BS could use the MAC-CE to configure one or multiple trigger states. Additionally, utilizing the MAC-CE to provide the triggering slot offset values to UEs allows for faster slot offset updates.

In other embodiments, the MAC-CE could be used to update the same slot offset to the same AP-SRS trigger state in multiple bandwidth parts (BWPs) or component carriers (CCs). In other words, when a CC in a group is indicated in the MAC-CE and has been provided a new triggering offset value, the other CCs in the same group would also receive the same triggering offset value. In doing so, overhead (in regard to bandwidth and latency, for example) would be reduced by not having to send as many transmissions to the same or multiple devices. In some embodiments, the MAC-CE received would be valid until the next MAC-CE is received. However, in other embodiments, the MAC-CE could have a hardcoded time duration in which to apply the MAC-CE update until said time duration had passed. In other embodiments, a time duration could be configured in RRC.

FIG. 9—Example Slot Offset

FIG. 9 illustrates an example of a slot offset between downlink control information (DCI) and an aperiodic (AP) sounding reference signal (SRS), according to some embodiments. FIG. 9 further illustrates the example that a minimum slot offset value of 1 provides the UE with at least 19 symbols between the DCI and SRS. This is due to the DCI inhabiting the first three symbols of the first slot and the SRS inhabiting the first available symbol of the last six of the second slot. FIG. 9 additionally illustrates this example in which the SRS can be transmitted in the last six symbols of a slot. As discussed above, this slot spacing or gap allows for the UE to have the time required to decode the DCI and then send the requested AP-SRS. Furthermore, due to differing processing capabilities of different UEs, some UEs may require less than 19 symbols as a minimum timing offset.

FIG. 10—Example Minimum Timing Offset Capability Reporting

FIG. 10 illustrates an example of the minimum timing offset for UE capability reporting for AP-SRS, according to some embodiments. This example of the minimum timing offset is defined as the number of symbols between the last symbols of the triggering DCI and the first symbol of the corresponding trigger AP-SRS transmission. As discussed above, this minimum timing offset, which can vary from UE to UE based on processing power, arises due to the UE needing a certain amount of time to decode the DCI before sending the AP-SRS signal. In some embodiments, when the timing offset configured by the base station is smaller than the minimum timing offset reported in the UE's capability information, the UE is not required to transmit the SRS. In other embodiments, when the timing offset configured by the base station is smaller than the minimum timing offset reported in the UE's capability information, the UE transmits the SRS in the next available and valid slot that satisfies the UE's reported minimum timing offset capability.

FIG. 11—Slot Bundling

FIG. 11 illustrates an example of when the UE is configured for SRS repetition or slot bundling, according to some embodiments. When the UE is configured as such, multiple AP-SRS transmissions are made consecutively following a single trigger signal from a base station. In particular, an SRS resource set can contain multiple SRS resources and each SRS resource can contain multiple ports. For example, when digital pre-coding is being utilized, the UE is able to sound (i.e. channel sounding) all of the physical antennas/beams in one SRS resource. In another scenario such as analog beam forming, for example, the UE is configured to sound each antenna or beam sequentially. In other words, the slot bundling or SRS repetition can be performed either at the SRS resource set level or SRS resource level. Moreover, when a UE experiences degraded signal quality due to having bad coverage at a high frequency band, for example, the UE may attempt to bundle a number of AP-SRS transmissions in order to provide increased processing gain or energy to the base station. Additionally, FIG. 11 illustrates that due to the consecutively transmitted AP-SRS' and the minimum timing offset, some of the symbols meet the minimum timing offset requirement (the last two AP-SRS transmissions on the right) and some of the symbols do not meet the minimum timing offset requirement (the first two AP-SRS transmissions on the left). Accordingly, in some embodiments, the UE could have the option to not transmit any SRS symbols when the minimum timing offset requirement is not met. In other embodiments, the UE could have the option to only transmit the SRS symbols that meet its minimum timing offset requirement.

Figure 12:
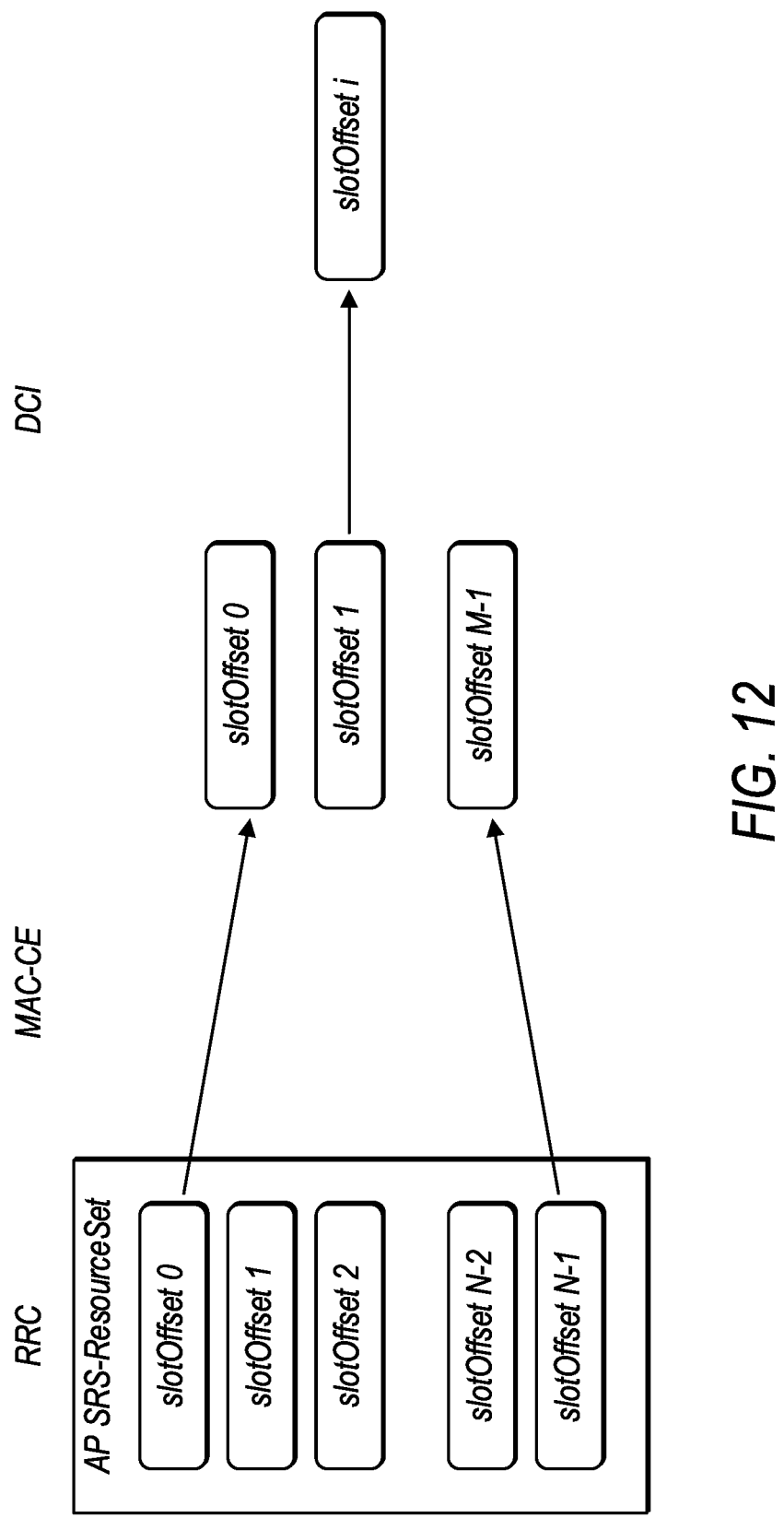
FIG. 12 illustrates an example of how a base station can allow the DCI to change the slot offset based on possible slot offsets configured or activated from an RRC or MAC-CE, according to some embodiments.

FIG. 12—Offset Value Selection

FIG. 12 illustrates an example of how a base station can allow the DCI to change the slot offset with one or multiple steps, according to some embodiments. In other words, FIG. 12 illustrates a more elaborate method whereby the base station can provide an initial set of possible offsets and then further select an offset from this initial list. In particular, FIG. 12 illustrates, for example, where during or after RRC configuration the base station provides a list of N possible slot offsets in an AP SRS-ResourceSet. Then later during communication with the UE the base station may transmit a MAC-CE activating up to M possible slot offsets from the N possible slot offsets configured by the RRC. Subsequent to this, the base station may then send DCI indicating 1 slot offset out of the M possible slot offsets activated by the MAC-CE. Furthermore, according to this embodiment, a new slot offset field can be introduced in the DCI's $\log_2$ M bit. In other embodiments, the BS can dynamically allow the DCI to introduce a new slot offset field in order to change the slot offset for each AP-SRS resource set. Furthermore, according to this embodiment, if the new slot offset field is absent, the UE would then proceed according to the previously RRC configured behavior.

Figure 13:
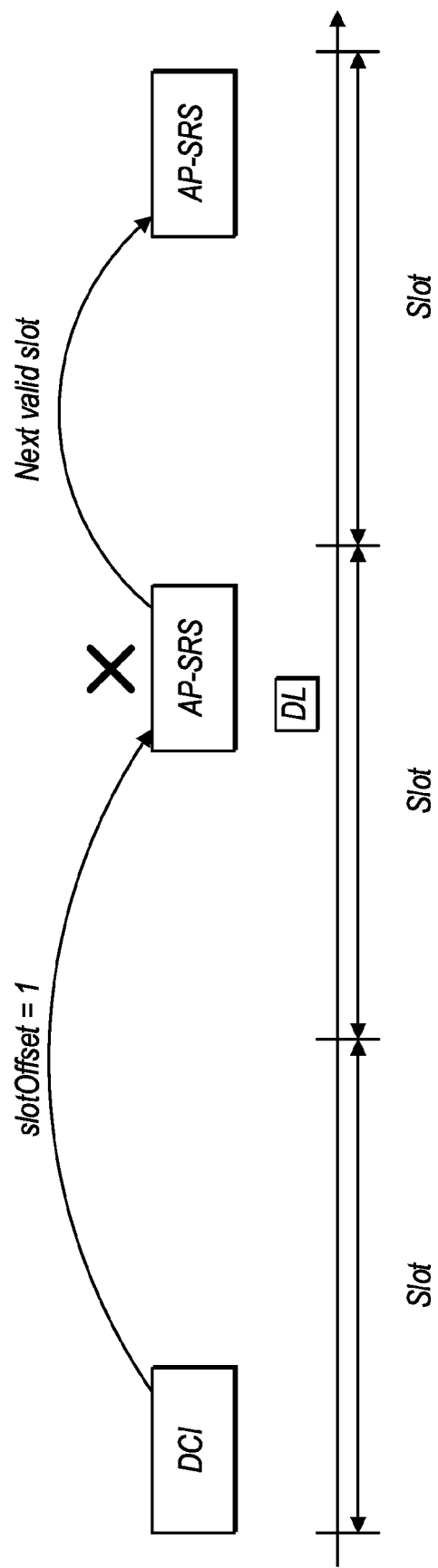
FIG. 13 illustrates an example of flexible AP-SRS triggering offset, according to some embodiments.

FIG. 13—Transmission of the SRS at the Next Available Slot

FIG. 13 illustrates an example of flexible AP-SRS triggering offset, according to some embodiments. In particular, FIG. 13 illustrates the example in which a slot offset of a UE's attempted AP-SRS transmission collides with DL symbols resulting in a conflict which prevents the UE from transmitting the AP-SRS. Upon encountering such a situation, the UE then attempts to transmit the AP-SRS at the next available valid slot. Furthermore, as discussed above with regard to FIG. 6, due to the base station's knowledge of the symbols, and their respective timings, being exchanged between the BS and the UE in UL and DL channels, the BS is able to predict or determine any future conflict that would arise due to overlapping or colliding symbols of the transmissions. Therefore, the BS would be aware of the collision and would expect an AP-SRS to be sent in this next available slot.

Figure 14:
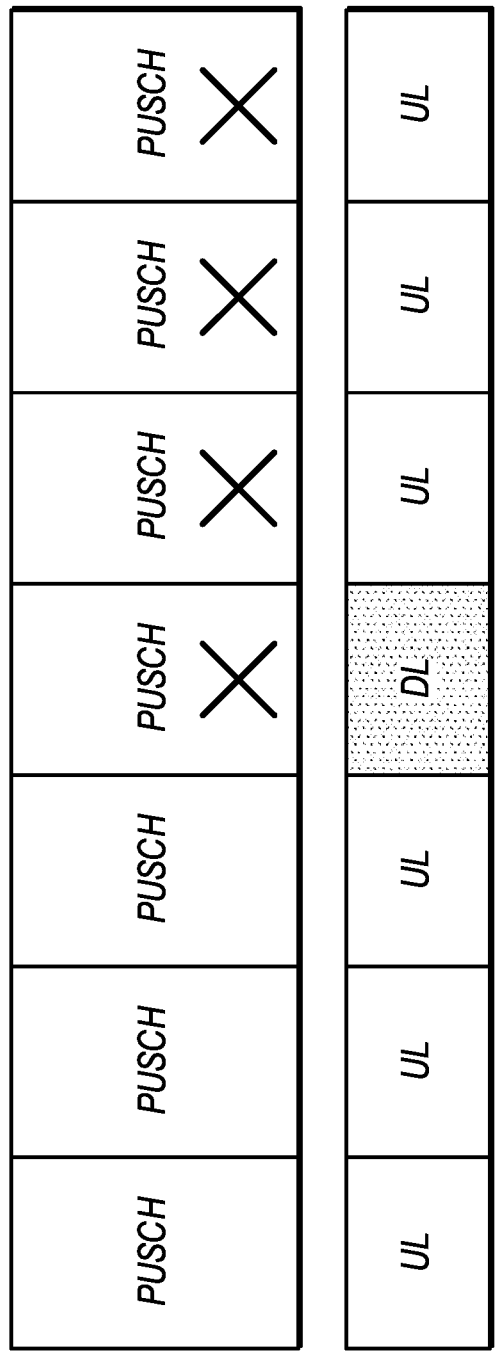
FIG. 14 illustrates an example of partial cancellation of a transmission from a UE, according to some embodiments.

FIG. 14—Partial Cancellation

FIG. 14 illustrates an example of partial cancellation of a transmission from a UE, according to some embodiments. The UE's capability of partial cancellation is determined from a report detailing a duplexing direction conflict from dynamic slot format indication (SFI) or dynamic downlink grant. Further, in some embodiments, the report can be detailed per band, per UE with FR1 (Frequency 1)/FR2 (Frequency 2) differentiation, per UE with TDD (Time Division Duplexing)/FDD (Frequency Division Duplexing) differentiation, or per UE with licensed/unlicensed differentiation. Additionally, in other embodiments, the report quantity can be of a single value indicating "support" or "not support". In some embodiments, the report contains a bit-map to indicate the support/non-support of each channel signal (PUCCH, PUSCH, PRACH, SRS). In particular, FIG. 16 illustrates the example of partial cancellation in which the first PUSCH transmission symbols are successfully transmitted but when a conflict occurs, such as with a downlink (DL) symbol shown in FIG. 16, the remaining PUSCH symbols are not transmitted due to the partial cancellation. Additionally, in some embodiments, the UE is not expected to recalculate the transport block (TB) for PUSCH transmission and/or rate matching, among other parameters. In other embodiments, certain dynamic SFI capabilities will be replicated from a previous 3GPP release in order to accommodate the previous cancellation capabilities in the previous releases and address non-backwards compatibility (NBC) issues. In other words, if the UE does not support partial cancellation, the BS will proceed accordingly with the appropriate cancellation capability from a previous release.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

In some embodiments, a user equipment (UE) or baseband processor (which may be part of a UE) may be configured to receive an initial aperiodic sounding reference signal (SRS) triggering offset from a base station (BS). Additionally or alternatively, the baseband processor and/or UE may be further configured to receive signaling from the BS specifying a new value for the aperiodic SRS triggering offset based at least in part on the BS determining that the SRS triggering offset should be adjusted. According to some embodiments, the baseband processor and/or UE may further be configured to receive an aperiodic SRS trigger from the BS and transmit an aperiodic SRS based on the received aperiodic SRS trigger. Additionally or alternatively, the aperiodic SRS may be transmitted in a time slot based at least in part on the new value specified for the aperiodic SRS triggering offset. In some embodiments, the signaling may specify a new value for the aperiodic SRS triggering offset for a plurality of component carriers or bandwidth parts.

According to some embodiments, the baseband processor and/or UE may be further configured to transmit a minimum timing offset of the UE to the base station. Additionally or alternatively, the minimum timing offset may be reported from a list of pre-stored or preset values. In some embodiments, the baseband processor may be further configured to transmit both a PUSCH-ProcessingType2 and a PUSCH-ProcessingType2-r16 when it transmits the minimum timing offset of the UE to the base station. Additionally or alternatively, the baseband processor may be further configured for SRS repetition or slot bundling in which multiple AP-SRS transmissions are consecutively made in response to one or more trigger signals from the base station.

What is claimed is:

1. An apparatus, comprising:
at least one processor configured to cause a cellular base station (BS) to:
determine an aperiodic sounding reference signal (SRS) triggering offset for a user equipment (UE), wherein the aperiodic SRS triggering offset is based on a minimum timing offset received from the UE and specifies a timing offset between an aperiodic SRS trigger received by the UE in a downlink control information (DCI) message and transmission of the SRS by the UE in response to the aperiodic SRS trigger;
transmit an initial set of aperiodic SRS triggering offset values for an SRS resource set to the UE via radio resource control (RRC) signaling; and
transmit the DCI message to the UE specifying one offset value from the initial set of aperiodic SRS triggering offset values.

2. The apparatus of claim 1, wherein the cellular base station is configured to transmit the signaling to the UE specifying a new value for the aperiodic SRS triggering offset in a medium access control (MAC) control element (CE).

3. The apparatus of claim 1, wherein the cellular base station is configured to receive, from the UE, an indication of whether the UE requires a minimum of a 19 symbol timing offset.

4. The apparatus of claim 1, wherein the signaling specifies a new value for the aperiodic SRS triggering offset for a plurality of component carriers or bandwidth parts of the UE.

5. The apparatus of claim 1, wherein the cellular base station is further configured to determine that the SRS triggering offset should be adjusted by determining that a previously requested AP-SRS was not transmitted.

6. The apparatus of claim 1, wherein the cellular base station is further configured to determine that the SRS triggering offset should be adjusted by determining that an AP-SRS transmission collided with, or will collide with, one or more downlink (DL) symbols.

7. A method, comprising:
by a base station (BS):
determining an aperiodic sounding reference signal (SRS) triggering offset for a user equipment (UE), wherein the aperiodic SRS triggering offset is based on a minimum timing offset received from the UE and specifies a timing offset between an aperiodic SRS trigger received by the UE in a downlink control information (DCI) message and transmission of the SRS by the UE in response to the aperiodic SRS trigger;
transmitting an initial set of aperiodic SRS triggering offset values for an SRS resource set to the UE via radio resource control (RRC) signaling; and
transmitting the DCI message to the UE specifying one offset value from the initial set of aperiodic SRS triggering offset values.

8. The method of claim 7, further comprising transmitting signaling from the BS to the UE specifying a new value for an aperiodic SRS triggering offset in a medium access control (MAC) control element (CE).

9. The method of claim 7, further comprising transmitting signaling from the BS to the UE which specifies a new value for an aperiodic SRS triggering offset for a plurality of component carriers or bandwidth parts of the UE.

10. The method of claim 7, further comprising determining that the SRS triggering offset should be adjusted, based at least in part in response to determining that a previously requested AP-SRS was not transmitted.

11. The method of claim 7, further comprising determining that the SRS triggering offset should be adjusted in response to determining that an attempted AP-SRS transmission collided with, or is anticipated to collide with, one or more downlink (DL) symbols.

12. A processor configured to:
transmit, to a base station (BS), a minimum timing offset of a user equipment (UE);

receive an initial set of aperiodic sounding reference signal (SRS) triggering offset values for an SRS resource set from the BS via radio resource control (RRC) signaling;

receive a downlink control information (DCI) message from the BS specifying one value from the initial set of aperiodic SRS triggering offset values, wherein the one value is based on the minimum timing offset received from the UE;

receive an aperiodic SRS trigger from the BS in the DCI message; and, transmit an aperiodic SRS based on the received aperiodic SRS trigger, wherein the aperiodic SRS is transmitted in a time slot based at least in part on the one value specified from the initial set of aperiodic SRS triggering offset values.

13. The processor of claim 12, wherein the signaling specifies a new value for the aperiodic SRS triggering offset for a plurality of component carriers or bandwidth parts.

14. The processor of claim 12, wherein the processor is further configured to transmit, to the base station, an indication of whether the UE requires a minimum of a 19 symbol timing offset.

15. The processor of claim 14, wherein the minimum timing offset is reported from a list of pre-stored or preset values.

16. The processor of claim 14, wherein the processor is further configured to transmit both a PUSCH-ProcessingType2 and a PUSCH-ProcessingType2-r16 when it transmits the minimum timing offset of the UE to the base station.

17. The processor of claim 12, wherein the processor is further configured to configure the UE for SRS repetition or slot bundling in which multiple AP-SRS transmissions are consecutively made in response to one or more trigger signals from the base station.

18. The processor of claim 12, wherein the processor is further configured to:

receive signaling from the BS specifying a new value for an aperiodic SRS triggering offset in a medium access control (MAC) control element (CE).

19. The processor of claim 12, wherein the processor is further configured to:

receive, from the BS, additional signaling indicating that the one value should be adjusted in response to the BS determining that an attempted AP-SRS transmission collided with, or is anticipated to collide with, one or more downlink (DL) symbols.

20. The processor of claim 12, wherein the processor is a baseband processor.

\* \* \* \* \*